United States Patent
Yu et al.

(10) Patent No.: US 11,947,709 B2
(45) Date of Patent: Apr. 2, 2024

(54) ELECTRONIC DEVICE FOR CONTROLLING ACCESS TO DEVICE RESOURCE AND OPERATION METHOD THEREOF

(71) Applicant: Samsung Electronics Co., Ltd., Gyeonggi-do (KR)

(72) Inventors: Hyungseok Yu, Gyeonggi-do (KR); Taeho Kim, Gyeonggi-do (KR); Kwangsik Choi, Gyeonggi-do (KR); Seyoung Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 731 days.

(21) Appl. No.: 17/006,229

(22) Filed: Aug. 28, 2020

(65) Prior Publication Data
US 2021/0064770 A1 Mar. 4, 2021

(30) Foreign Application Priority Data

Aug. 29, 2019 (KR) .......................... 10-2019-0106729

(51) Int. Cl.
*G06F 21/62* (2013.01)
*G06F 9/455* (2018.01)
(Continued)

(52) U.S. Cl.
CPC ........ *G06F 21/629* (2013.01); *G06F 9/45558* (2013.01); *G06F 21/575* (2013.01);
(Continued)

(58) Field of Classification Search
CPC .. G06F 21/629; G06F 9/45558; G06F 21/575; G06F 21/74; G06F 2221/2141
See application file for complete search history.

(56) References Cited

U.S. PATENT DOCUMENTS

| 8,943,288 B2 * | 1/2015 | Heo .................... G06F 12/1491 |
| | | 711/163 |
| 9,003,543 B2 | 4/2015 | Reierson et al. |

(Continued)

FOREIGN PATENT DOCUMENTS

KR 1020150124757 11/2015

OTHER PUBLICATIONS

Machine translation of Korean patent application No. KR 20140051707A. (Year: 2014).*

(Continued)

*Primary Examiner* — Shanto Abedin
(74) *Attorney, Agent, or Firm* — The Farrell Law Firm, P.C.

(57) ABSTRACT

An electronic device for controlling access to a device resource, and an operation method thereof, are disclosed. The electronic device may include a memory; and a processor configured to execute at least one operating system executed in a first region allowing an operation based on a first authority; execute at least one application executed in a second region allowing an operation based on a second authority; and in response to detection of access to at least one device resource by the at least one application, determine authority of access to the at least one device resource by using an authority determination module executed in a third region allowing an operation based on a third authority.

14 Claims, 15 Drawing Sheets

(51) Int. Cl.
*G06F 21/57* (2013.01)
*G06F 21/74* (2013.01)

(52) U.S. Cl.
CPC .... *G06F 21/74* (2013.01); *G06F 2009/45587* (2013.01); *G06F 2221/2141* (2013.01)

(56) References Cited

U.S. PATENT DOCUMENTS

| | | | |
|---|---|---|---|
| 9,218,489 B2 | 12/2015 | Mooring et al. | |
| 10,650,157 B2 | 5/2020 | Schultz et al. | |
| 10,972,449 B1* | 4/2021 | Levin | G06F 21/606 |
| 2006/0174319 A1* | 8/2006 | Kraemer | G06F 21/57 |
| | | | 726/1 |
| 2006/0236127 A1* | 10/2006 | Kurien | G06F 21/57 |
| | | | 713/193 |
| 2011/0141124 A1 | 6/2011 | Halls et al. | |
| 2012/0254982 A1 | 10/2012 | Sallam | |
| 2012/0299847 A1 | 11/2012 | Kwon et al. | |
| 2013/0132695 A1* | 5/2013 | Heo | G06F 12/1491 |
| | | | 711/163 |
| 2014/0189852 A1* | 7/2014 | Swingler | G06F 21/60 |
| | | | 726/17 |
| 2018/0114002 A1 | 4/2018 | Webb et al. | |
| 2018/0129525 A1* | 5/2018 | Hong | G06F 9/5005 |
| 2019/0087185 A1 | 3/2019 | Kim | |
| 2019/0243655 A1* | 8/2019 | Milburn | G06F 21/52 |

OTHER PUBLICATIONS

Machine translation of Chinese patent application No. CN 109086100 A. (Year: 2018).*
European Search Report dated Jul. 8, 2022 Issued in counterpart application No. 20858699.0-1218, 7 pages.
Indian Examination Report dated Jun. 30, 2022 issued in counterpart application No. 202217008431, 6 pages.
Hypervision across worlds: Real-time kernel protection from the arm trustzone secure world.
Secure an Android Device https://source.android.com/security.
Trusty TEE https://source.android.com/security/trusty.
International Search Report dated Dec. 11, 2020 issued in counterpart application No. PCT/KR2020/011374, 7 pages.

* cited by examiner

ELECTRONIC DEVICE FOR CONTROLLING ACCESS TO DEVICE RESOURCE AND OPERATION METHOD THEREOF

CROSS-REFERENCE TO RELATED APPLICATION(S)

This application is based on and claims priority under 35 U.S.C. 119 to Korean Patent Application No. 10-2019-0106729, filed on Aug. 29, 2019, in the Korean Intellectual Property Office, the disclosure of which is incorporated herein by reference in its entirety.

BACKGROUND

1. Field

Various embodiments relate to an electronic device for controlling access to a device resource and an operation method thereof.

2. Description of Related Art

An electronic device includes various types of device resources. For example, device resources may include at least one camera module, at least one sensor module, at least one speaker module, at least one microphone module, and/or at least one display module. An electronic device as described above may be implemented, by using at least one device resource, in a type of a comprehensive multimedia device (player) providing various functions, such as taking a photo or video, reproducing a music or video file, executing a game, receiving a broadcast, and supporting wireless Internet.

Generally, an electronic device may manage authority of access to device resources on a framework through a database. However, the database can be easily accessed or forged (falsified) by malicious use (e.g. rooting, framework changing, etc.) of the electronic device. Accordingly, there occurs a problem in that a device resource of the electronic device may be used in a malicious situation, such as when the electronic device is lost or stolen.

SUMMARY

Therefore, various aspects are to provide a method and a device for preventing forgery (or falsification) of a database (e.g. an input/output database of a device resource) related to a device resource of an electronic device, and preventing malicious use of a device resource of the electronic device. According to an aspect, an electronic device includes a memory; and a processor, wherein the processor is configured to execute at least one operating system executed in a first region allowing an operation based on a first authority; execute at least one application executed in a second region allowing an operation based on a second authority; and in response to detection of access to at least one device resource by the at least one application, configure authority of the at least one application to access the at least one device resource by using an authority determination module executed in a third region allowing an operation based on a third authority.

According to an aspect, an operation method of an electronic device includes executing at least one operating system executed in a first region allowing an operation based on a first authority; executing at least one application executed in a second region allowing an operation based on a second authority; and in response to detection of access to at least one device resource by the at least one application, configuring authority of the at least one application to access the at least one device resource by using an authority determination module executed in a third region allowing an operation based on a third authority.

According to various embodiments, in a region in which a hypervisor (EL2), a secure EL2, or a virtual machine manager (VMM) are executed, authority of an application to access at least one device resource may be determined to prevent forgery (or falsification) of a configured authority related to the device resource of an electronic device, and prevent malicious use of the device resource of the electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments will be described in detail with reference to the accompanying drawings. In addition, in describing the embodiments, a detailed description of known relevant functions or configurations incorporated herein will be omitted when it may make the subject matter of the disclosure unclear. The terms as described below are defined in consideration of the functions in the disclosure, and the meaning of the terms may vary according to the intention of a user or operator, convention, or the like. Therefore, the definitions of the terms should be made based on the contents throughout the specification.

Figure 1:
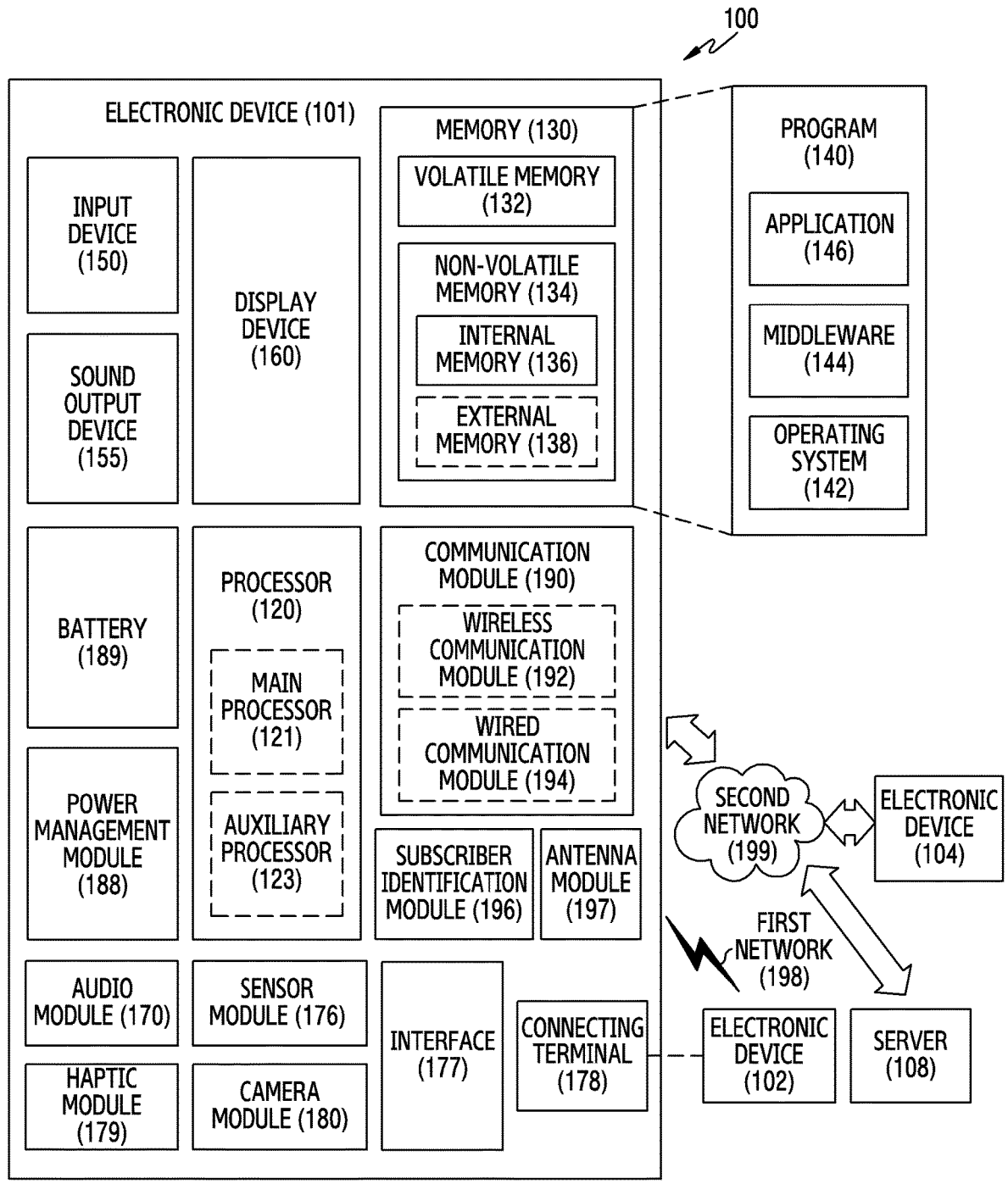
FIG. 1 is a block diagram of an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images.

According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
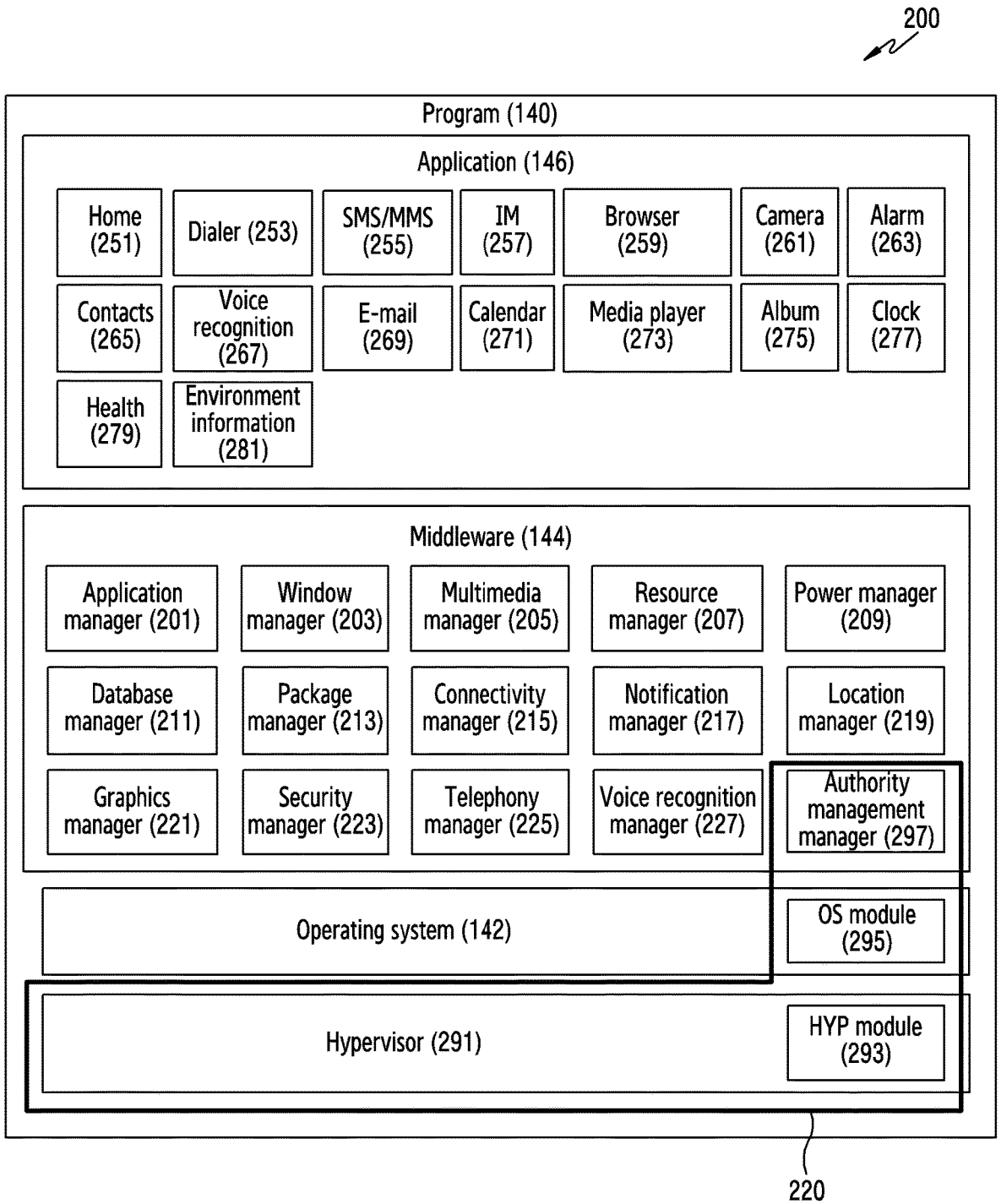
FIG. 2 is a block diagram showing an example of a program according to an embodiment.

FIG. 2 is a block diagram 200 illustrating an example of a program 140 according to various embodiments. According to an embodiment, the program 140 may include an operating system 142 for controlling at least one resource of the electronic device 101, middleware 144, or an application 146 that are executable in the operating system 142. The operating system 142 may include, for example, Android™, iOS™, Windows™, Symbian™, Tizen™, or Bada™. At least a part of the program 140 may be, for example, preloaded on the electronic device 101 upon manufacture, or downloaded or updated from an external electronic device (for example, the electronic device 102 or 104, or the server 108) when used by a user.

The operating system 142 may control management (e.g. allocation or deallocation) of at least one system resource (e.g. a process, a memory, or a power source) of the electronic device 101. The operating system 142 may additionally or alternatively include at least one driver program for operating another hardware device (e.g. a device resource) of the electronic device 101, for example, an input device 150, a sound output device 155, a display device 160, an audio module 170, a sensor module 176, an interface 177, a haptic module 179, a camera module 180, a power management module 188, a battery 189, a communication module 190, a SIM 196, or an antenna module 197.

The middleware 144 may provide various functions to the application 146 so that the application 146 uses a function or information provided from at least one resource of the electronic device 101. The middleware 144 includes, for example, an application manager 201, a window manager 203, a multimedia manager 205, a resource manager 207, a power manager 209, a database manager 211, a package manager 213, a connectivity manager 215, a notification manager 217, a location manager 219, a graphics manager 221, a security manager 223, a telephony manager 225, or a voice recognition manager 227.

The application manager 201 may manage, for example, a life cycle of the application 146. The window manager 203 may manage, for example, at least one GUI resource used in a screen. The multimedia manager 205 may, for example, identify one or more formats required for reproducing media files, and encode or decode a corresponding media file among the media files by using a codec matching a corresponding format selected among the formats. The resource manager 207 may manage, for example, a source code of the application 146, or a memory space of the memory 130. The power manager 209 may, for example, manage the capacity, temperature, or power of the battery 189, and determine or provide relevant information required for an operation of the electronic device 101 by using corresponding information among the capacity, temperature, or power. According to an embodiment, the power manager 209 may be linked to a basic input/output system (BIOS) of the electronic device 101.

The database manager 211 may, for example, generate, search for, or change a database to be used by the application 146. The package manager 213 may manage, for example, installation or update of an application distributed in a package file form. The connectivity manager 215 may manage, for example, wireless connection or direct connection between the electronic device 101 and an external electronic device. The notification manager 217 may provide, for example, a function for notifying a user of occurrence of a designated event (e.g. an incoming call, a message, or an alarm). The location manager 219 may manage, for example, location information of the electronic device 101. The graphics manager 221 may manage, for example, at least one graphic effect to be provided to a user, or a relevant user interface.

The security manager 223 may provide, for example, system security or user authentication. The telephony manager 225 may manage, for example, a voice call function or a video call function provided by the electronic device 101. The voice recognition manager 227 may, for example, transmit voice data of a user to the server 108, and receive, from the server 108, an instruction corresponding to a function to be performed in the electronic device 101, based on at least a part of the voice data, or character data converted based on at least a part of the voice data. According to an embodiment, the middleware 244 may dynamically remove a part of existing elements or add new elements. According to an embodiment, at least a part of the middleware 144 may be included in the operating system 142 as a part thereof, or may be implemented as separate software different from the operating system 142.

The application 146 may include an application related to home 251, dialer 253, SMS/MMS 255, instant message (IM) 257, browser 259, camera 261, alarm 263, contacts 265, voice recognition 267, e-mail 269, calendar 271, media player 273, album 275, clock 277, health 279 (for example, measuring biometric information such as exercise quantity or blood sugar), or environment information 281 (for example, measuring of atmospheric pressure, humidity, or temperature information). According to an embodiment, the application 146 may further include an information exchange application for supporting information exchange between the electronic device 101 and an external electronic device. The information exchange application may include, for example, a notification relay application configured to transfer designated information (e.g. a call, a message, or an alarm) to an external electronic device, or a device management application configured to manage an external electronic device. The notification relay application may, for example, transfer, to an external electronic device, notification information corresponding to a designated event (e.g. mail reception) that has occurred in another application (e.g. the email application 269) of the electronic device 101. Additionally or alternatively, the notification relay application may receive notification information from an external electronic device, and provide the notification information to a user of the electronic device 101.

The device management application may control, for example, power (e.g. turning-on or turning-off) or a function (e.g. the brightness, resolution, or focus of the display device 160 or the camera module 180) of an external electronic device communicating with the electronic device 101, or a part (e.g. the display device 160 or the camera module 180) of the elements of the external electronic device. The device management application may additionally or alternatively support installation, removal, or update of an application operating in an external electronic device.

According to various embodiments, the program 140 described above may include an additional element 220 for managing access to a device resource, as illustrated. The additional element 220 may include a hypervisor 291, a hyper (HYP) module 293, an operating system (OS) module 295, and an authority management manager 297.

According to an embodiment, the authority management manager 297 may access input/output of at least one device resource in response to a request of at least one application 146 and the operating system 142. According to an embodiment, the operating system module 295 may support information exchange between the authority management manager 297 and the HYP module 293. For example, if the operating system module 295 detects change of an access restriction authority configuration of a device resource, the change being made by the authority management manager 297, the operating system module may provide access restriction authority configuration information relating to the device resource to the HYP module 293. In addition, the operating system module 295 may obtain a result of access authority restriction configuration performed by the HYP module 293, and provide the obtained restriction configuration result to the authority management manager 297.

According to an embodiment, the hypervisor 291 may be in a region which the operating system 142 and at least one application 146 is unable to access. For example, the hypervisor 291 or the HYP module 293 operating in a region of the hypervisor 291 may manage at least one virtual machine. Alternatively or additionally, according to various embodiments, the hypervisor 291 or the HYP module 293 may manage authority of access to a device resource. For example, the hypervisor 291 or the HYP module 293 may determine whether a device resource to be accessed by the operating system 142 or at least one application 146 is a restricted resource, and may provide a determination result to the operating system module 295.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
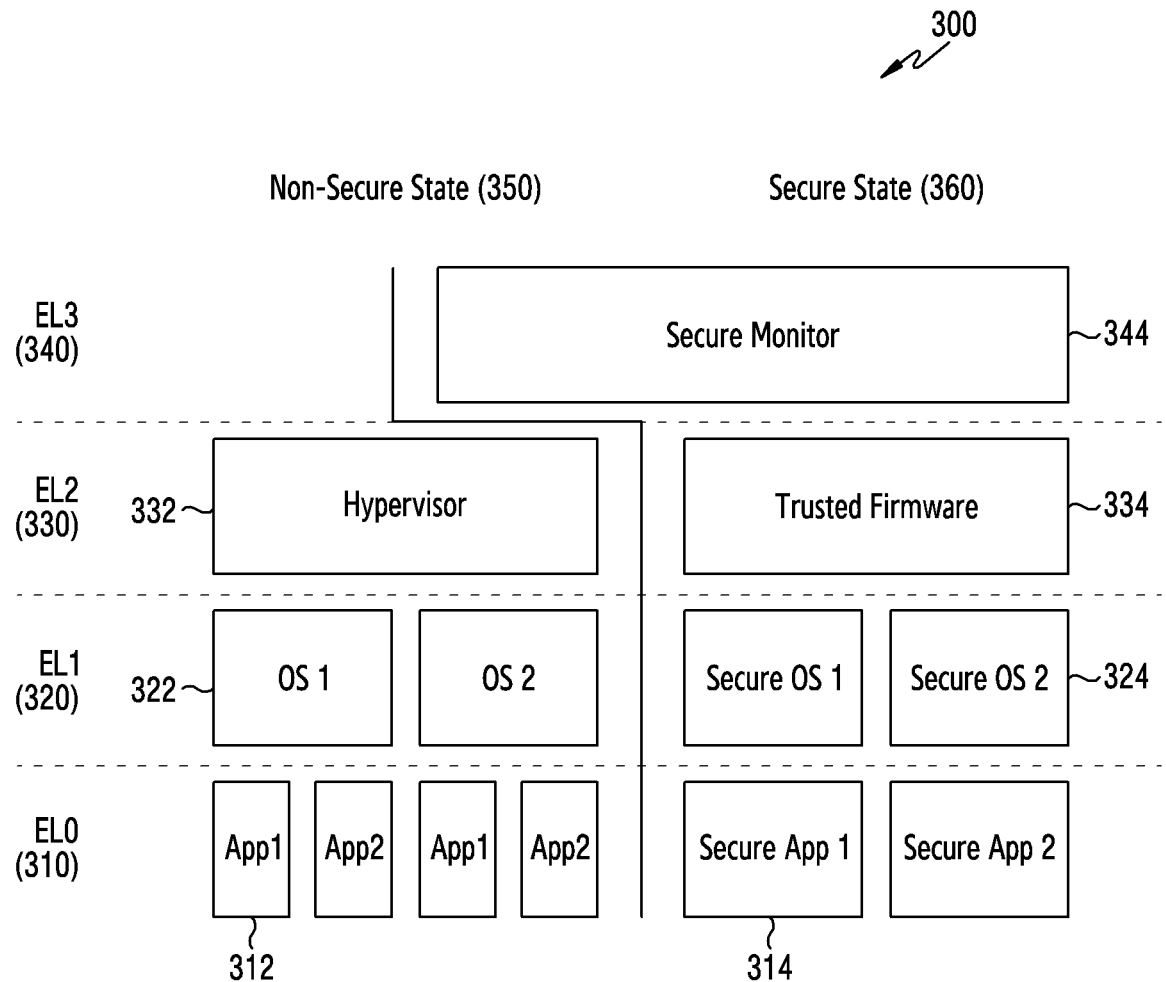
FIG. 3 is a diagram illustrating an architecture of a processor according to an embodiment.

FIG. 3 is a diagram 300 illustrating an architecture of the processor 120 according to various embodiments.

Referring to FIG. 3 the processor 120 may operate in multiple exception levels. The exception levels may be related to process authority levels processed by the processor 120. For example, the exception levels may include EL0, EL1, EL2, and EL3, and more authority may be assigned to a high number exception level (e.g. EL3), compared to a low number exception level (EL0). As illustrated in FIG. 3, at least one application 312 may be executed at EL0 310, and at least one operating system 322 may be executed at EL1 320. In addition, a hypervisor 332 may be executed at EL2 330. The at least one application 312, the at least one operating system 322, and the hypervisor 332 may be operated in a first region 350 called a non-secure state. In addition, the processor 120 may support a second region 360 called a secure state, which is separated from the first region 350 to prevent access by processes executed in the first region 350. Accordingly, a secure application (app) 314, a secure operating system (OS) 324, a trusted firmware 334, and a secure monitor 344 may be executed in the second region 360.

As described above, the processor 120 may provide the first region 350 and the second region 360. However, this is merely an example, and embodiments are not limited thereto. For example, the processor 120 may provide only the first region 350, or the second region 360.

According to an embodiment, the hypervisor 332 described above may manage at least one virtual machine. Alternatively or additionally, the hypervisor 332 may manage authority of access to a device resource. For example, the hypervisor 332 may manage an authority policy of a device resource at EL2 330 which the operating system 322 and at least one application 312 are unable to access. The authority policy may be data defining a device resource restricted from being (or allowed to be) accessed by the operating system 322 and the at least one application 312. In addition, the hypervisor 332 is able to configure the processor 120 to determine whether at least one application 312 and/or the operating system 322 has authority to access at least one device resource. For example, the hypervisor 332 is able to configure the processor 120 to: if an access to a device resource by at least one application 312 and/or the operating system 322 is detected, determine, based on a configured authority policy, whether the device resource to be accessed by the at least one application 312 and/or the operating system 322 is a restricted resource. For example, if the device resource is determined to be a restricted-access resource, the hypervisor 332 may receive information notifying of an access restriction from the processor 120, and notify of the information.

According to an embodiment, an electronic device may include a memory; and a processor, wherein the processor is configured to execute at least one operating system executed in a first region allowing an operation based on a first authority; execute at least one application executed in a second region allowing an operation based on a second authority; and configure authority of access to at least one device resource in response to detection of access to the at least one device resource by the at least one application by using an authority determination module executed in a third region allowing an operation based on a third authority. The authority determination module may include a hypervisor.

The third authority may include an authority higher than the first authority. The third region allowing an operation based on the third authority may include a region in which at least one of a hypervisor, a secure region, or a virtual machine manager (VMM) is executed.

The processor may be configured to store an authority policy defining a device resource restricted from being accessed by the at least one application, in the third region allowing an operation based on the third authority.

The processor may be configured to obtain the authority policy in the electronic device or from an external device.

The processor may be configured to provide the authority policy through a non-secure region of the processor to a non-secure region allowing an operation based on the third authority.

The processor may be configured to provide the authority policy through a secure region of the processor to a secure region allowing an operation based on the third authority.

The processor may be configured to provide the authority policy through a secure region of the processor to a non-secure region allowing an operation based on the third authority.

The processor may be configured to determine access authority of the at least one application, based on the configured authority of access to the at least one device resource; and if the configured authority is determined to be an authority by which access to the at least one device resource is restricted, provide information indicating restriction of access to the at least one device resource.

The processor may be configured to obtain a designated first authority policy during a boot-on operation, and after the boot-on operation is complete, obtain a second authority policy. For example, the first authority policy may be stored in the electronic device. In addition, the second authority policy may be obtained from the outside of the electronic device.

Figure 4A:
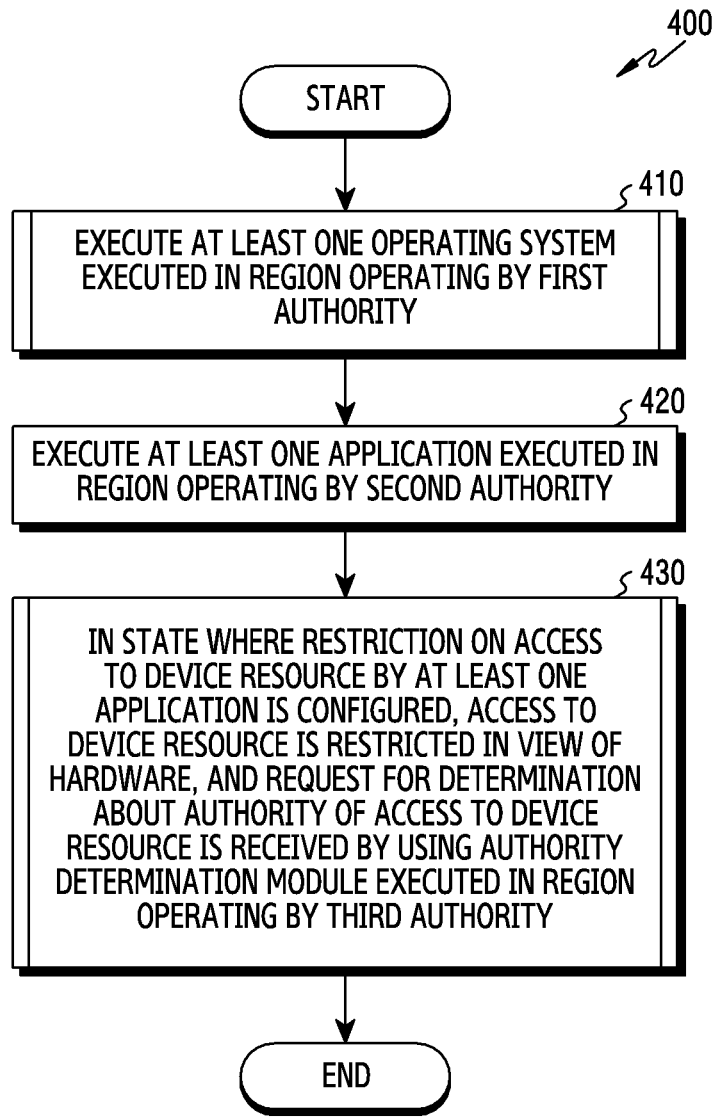
FIG. 4A is a flowchart for determining authority of access to a device resource in an electronic device according to an embodiment.

FIG. 4A is a flowchart 400 for determining authority of access to a device resource in the electronic device 101 according to an embodiment. In an embodiment described below, operations may be sequentially performed, but the disclosure is not limited to the sequential operations. For example, the sequences of operations may be changed, and at least two operations may be performed in parallel.

Referring to FIG. 4A, the electronic device 101 (or the processor 120) may execute at least one operating system in step 410. The processor 120 may process at least one operating system to be executed in a region allowing an operation based on a first authority. For example, the region allowing an operation based on the first authority may correspond to an exception level (e.g. EL1 320) to which more authority has been assigned compared to a low number exception level (EL0 310).

The processor 120 may execute at least one application in step 420. The processor 120 may process execution of at least one application executed in a region allowing an operation based on a second authority. For example, the region allowing an operation based on the second authority may correspond to an exception level (EL0) to which less authority has been assigned compared to the region allowing an operation based on the first authority.

The processor 120 may determine authority of the at least one application to access a device resource, in step 430. In a state where a restriction on access to a device resource by at least one application is configured, access to the device resource is restricted in view of hardware, and the processor 120 may be requested to determine authority of access to the device resource by using an authority determination module executed in a region allowing an operation based on a third authority. For example, the region allowing an operation based on the third authority may be a region in which a hypervisor, a virtual machine, and a secure EL2 are executed. For example, the region allowing an operation based on the third authority may correspond to an exception level (EL2 330) to which more authority has been assigned compared to the region allowing an operation based on the first authority. In addition, the authority determination module may include a hypervisor.

Figure 4B:
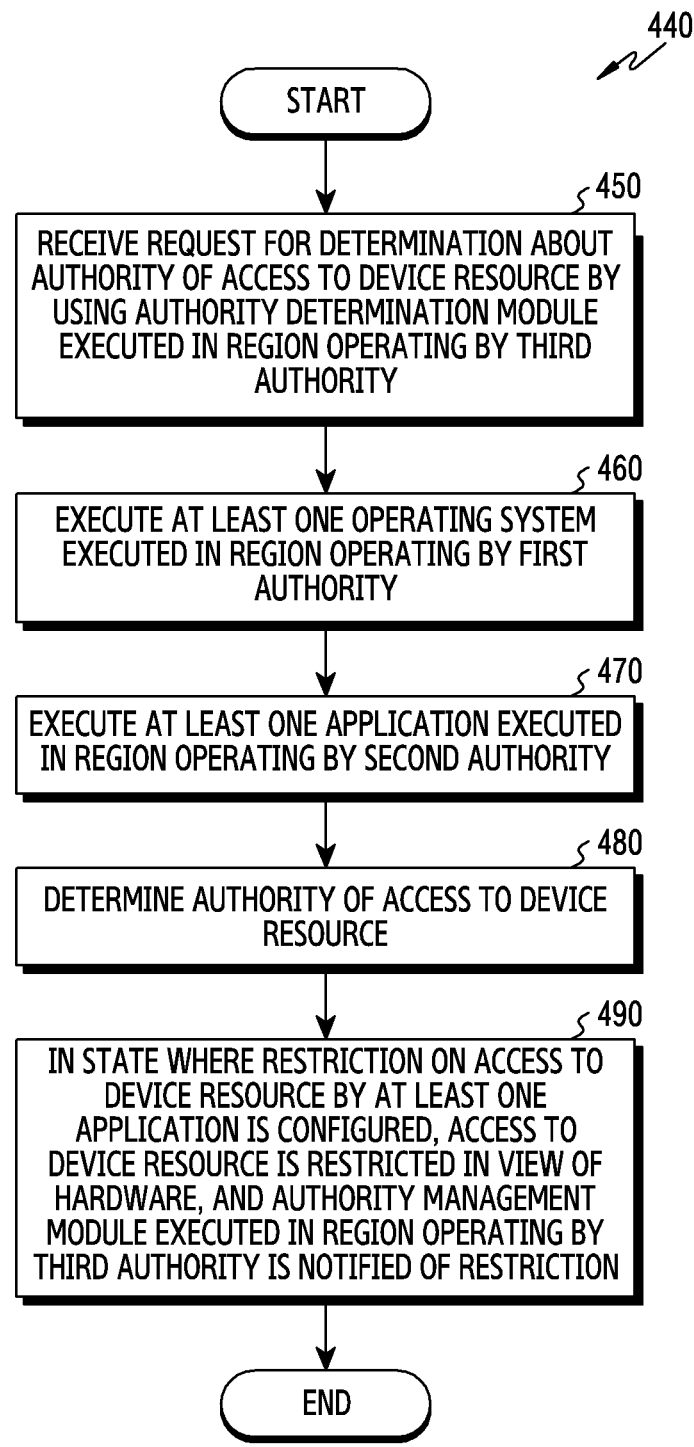
FIG. 4B is a flowchart for determining authority of access to a device resource in an electronic device according to an embodiment.

FIG. 4B is a flowchart 440 for determining authority of access to a device resource in an electronic device according to an embodiment. In an embodiment described below, operations may be sequentially performed, but the disclosure is not limited to the sequential operations. For example, the sequences of operations may be changed, and at least two operations may be performed in parallel.

Referring to FIG. 4B, the electronic device 101 (or. the processor 120) may receive a request for determining authority of access to a device resource from an authority determination module executed in a region (e.g. EL2 330) allowing an operation based on a third authority, in step 450. For example, the region allowing an operation based on the third authority may correspond to an exception level to which more authority has been assigned compared to the region (e.g. EL1 320) allowing an operation based on the first authority, as described above. In addition, the authority determination module may include a hypervisor 332. The authority determination module may be configured to configure authority of access to a device resource. For example, the authority determination module may provide a configured access authority to the processor 120 to request determination of authority of access to a device resource.

The processor 120 may execute at least one operating system in step 460. The processor 120 may process at least one operating system to be executed in a region allowing an operation based on a first authority. For example, the region allowing an operation based on the first authority may correspond to an exception level to which more authority than that of a region (e.g. EL0 310) allowing an operation based on a second authority has been assigned.

The processor 120 may execute at least one application in step 470. The processor 120 may process execution of at least one application executed in a region allowing an operation based on a second authority. For example, the region allowing an operation based on the second authority may correspond to an exception level to which less authority has been assigned compared to the region allowing an operation based on the first authority.

The processor 120 may determine authority of the executed at least one application to access the device resource, in step 480. The processor 120 may determine the access authority of at least one application accessing particular hardware, based on an access authority received from the authority determination module.

The processor 120 may perform processing such that a restriction on access to the device resource by the at least one application is configured, in step 490. In response to detection of access, by at least one application, to a device resource for which an access restriction is configured, the processor 120 may perform processing such that a restriction on access to the device resource is configured. In addition, the processor 120 may notify an authority management module that the access restriction is configured. For example, in a state where a restriction on access to a device resource by at least one application is configured, access to the device resource is restricted in view of hardware, and the authority management module executed in the region allowing an operation based on the third authority may be notified of information informing that access to the device resource is restricted.

Figure 5:
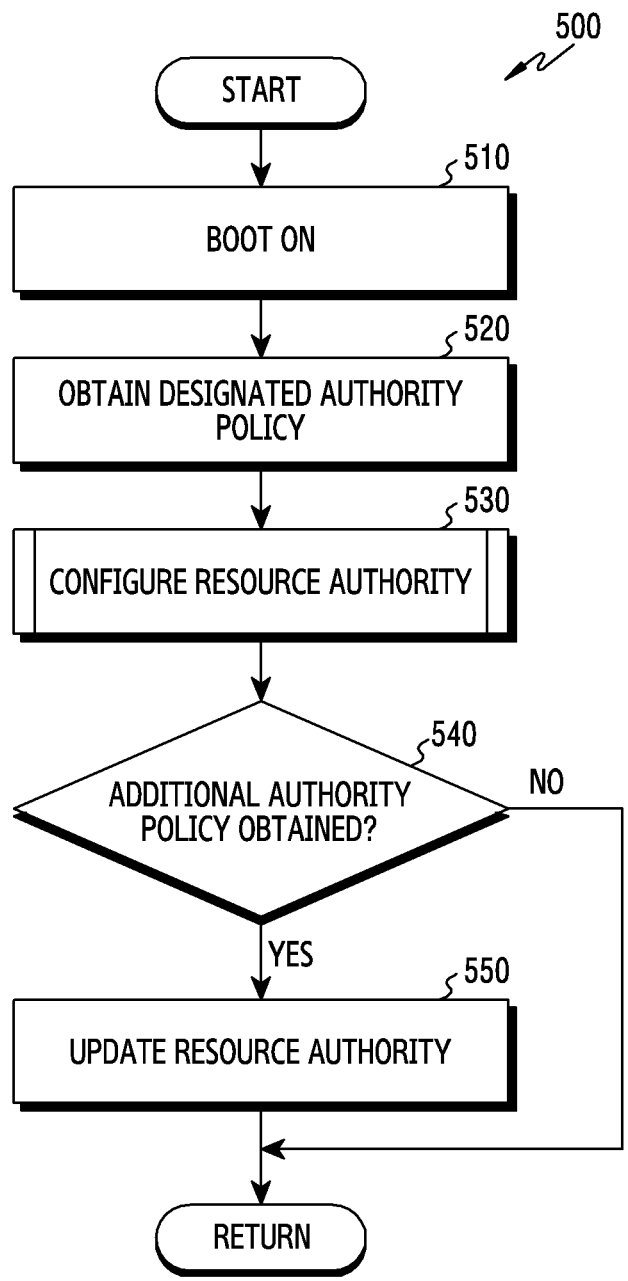
FIG. 5 is a flowchart for configuring an authority policy in an electronic device according to an embodiment.
Figure 6:
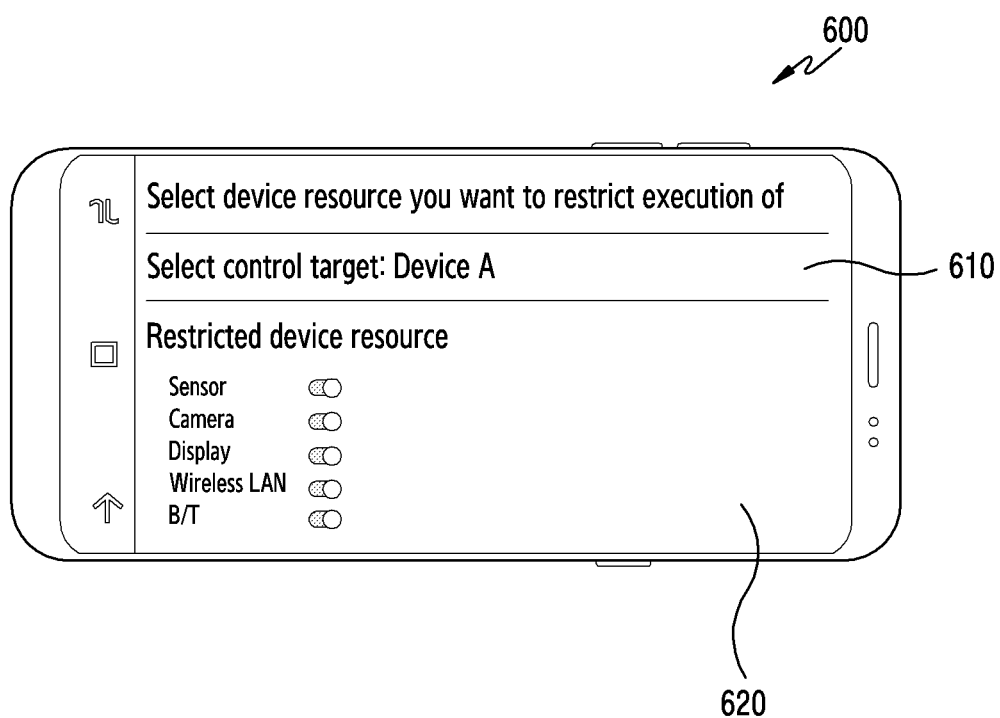
FIG. 6 is a diagram illustrating an additional policy authority according to an embodiment.

FIG. 5 is a flowchart 500 for configuring an authority policy in the electronic device 101 according to an embodiment. In addition, FIG. 6 is a diagram 600 illustrating an additional policy authority according to an embodiment. The steps in FIG. 5 described below may correspond to various embodiments of step 410 in FIG. 4A. In addition, in an embodiment below, operations may be sequentially performed, but the disclosure is not limited to the sequential operations. For example, the sequences of operations may be changed, and at least two operations may be performed in parallel.

Referring to FIG. 5, according to various embodiments, the electronic device 101 (or the processor 120) may perform a boot-on operation in step 510. The processor 120 may perform a boot-on operation in response to reception of an input indicating the boot-on operation. For example, the input indicating the boot-on operation may include a power key input. As another example, the input indicating the boot-on operation may be related to a power supply to the electronic device 101.

The processor 120 may obtain a designated authority policy in step 520. The authority policy may be data defining a device resource restricted from being (or allowed to be) accessed by the operating system 322 and/or at least one application 312, as described above. For example, the authority policy may be encrypted and stored in a predesignated storage space (e.g. a storage space having a predetermined level of security level). For example, the authority policy may be obtained by a framework module operating in a region allowing an operation based on a first authority, as described below with reference to FIGS. 7 and 8.

The processor 120 may configure a resource authority, based on the obtained authority policy, in step 530. The processor 120 may configure a resource authority by storing the obtained authority policy in a region (e.g. EL2) allowing an operation based on a third authority, as described below with reference to FIGS. 7 and 8. In addition, the processor 120 may perform a resource authority operation before the boot-on operation is complete.

The processor 120 may determine whether an additional authority policy is obtained, in step 540. The additional authority policy may be obtained in a state where the boot-on operation has been complete. For example, the additional authority policy may be received through an external electronic device (e.g. the electronic device 102, the electronic device 104, or the server 108). The processor 120 may obtain an additional authority policy defining at least one device resource restricted or allowed based on a user's input. As illustrated in FIG. 6, a user may select a target (e.g. a control target) for which access to a device resource is controlled, through an external electronic device (as indicated by reference numeral 610). The user may select at least one device resource, access to which is restricted or allowed, among the device resources of the selected control target (as indicated by reference numeral 620). For example, the user may control access to all sensors among the device resources. In addition, the user may control access to a part of the sensors among the device resources. For example, the additional authority policy may be defined by a user who lost the electronic device 101. As another example, the additional authority policy may be defined by an external company (e.g. a financial institution) for claiming (or securing) ownership of the electronic device 101.

The processor 120 may execute at least one operating system if the additional authority policy is not obtained. For example, the processor 120 may perform an operation related to step 401 in FIG. 4A.

If the additional authority policy is obtained, the processor 120 may update the resource authority, based on the additional authority policy, in step 550. The processor 120 may update the resource authority by updating the policy authority stored in the region allowing an operation based on the third authority, based on the obtained additional policy authority. In addition, after updating the resource authority, the processor 120 may execute at least one operating system. For example, the processor 120 may perform an operation related to step 401 in FIG. 4A.

Figure 7:
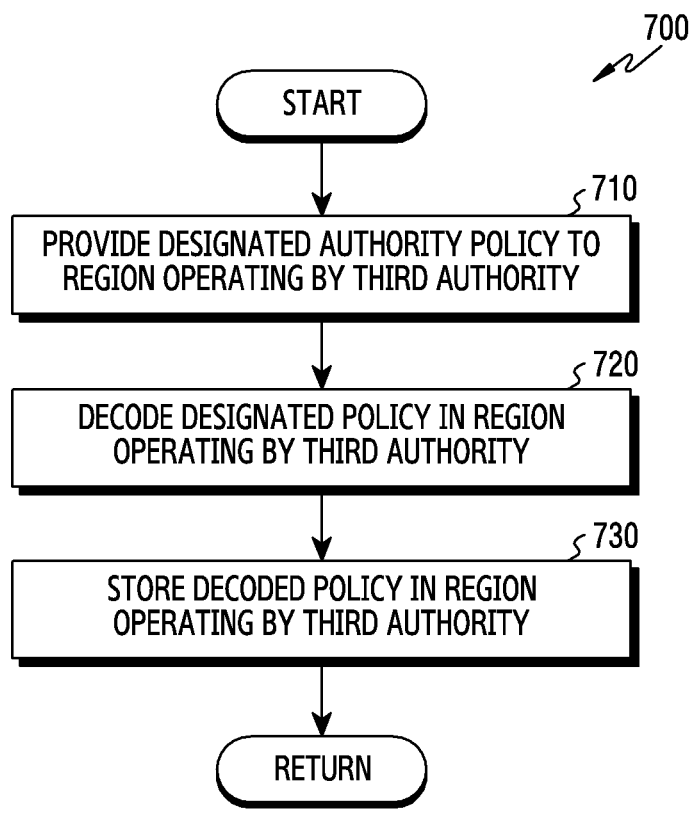
FIG. 7 is a flowchart for configuring a resource authority in an electronic device according to an embodiment.
Figure 8A:
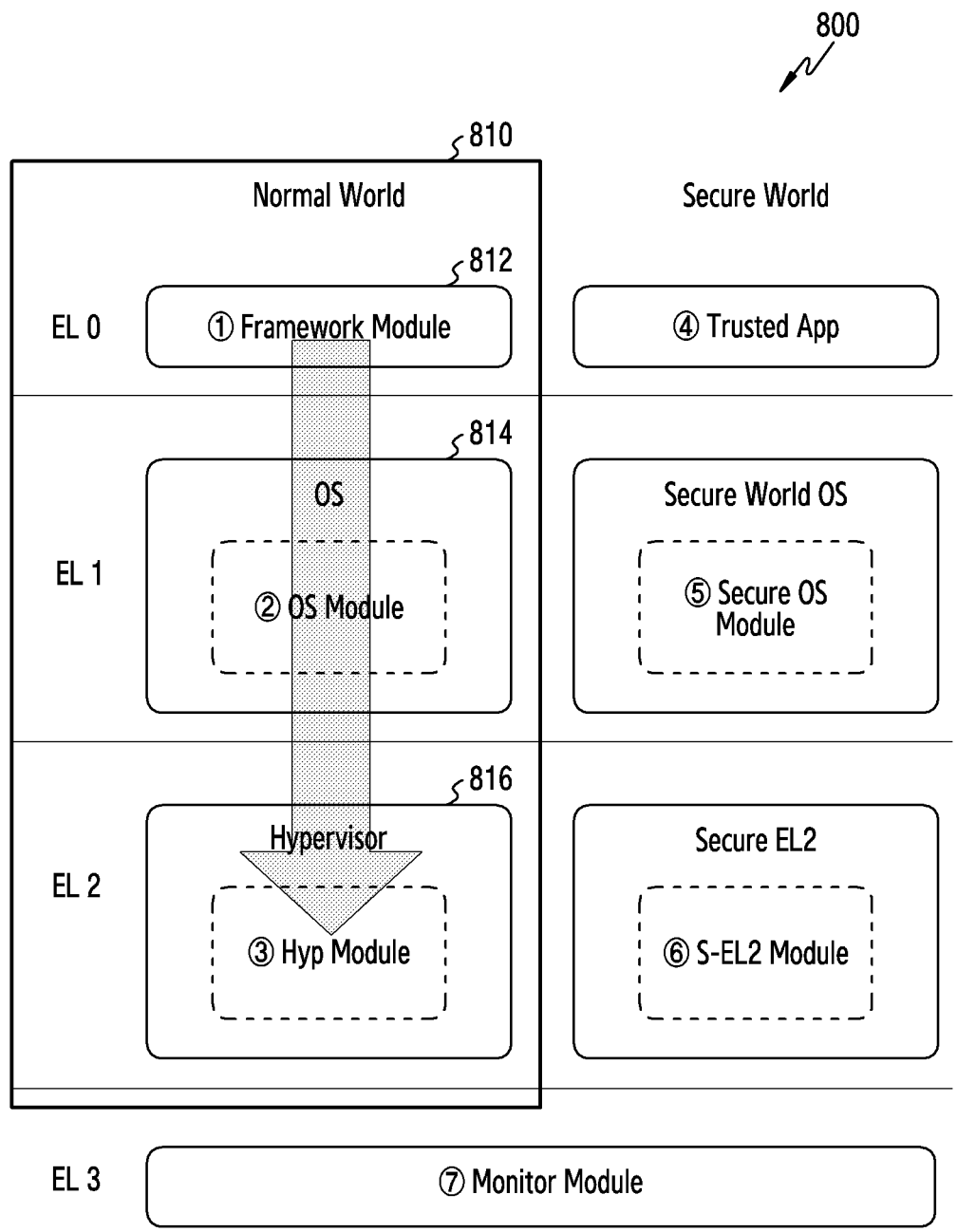
FIG. 8A is a diagram illustrating a procedure of providing an authority policy to a region allowing an operation based on a third authority according to an embodiment.
Figure 8B:
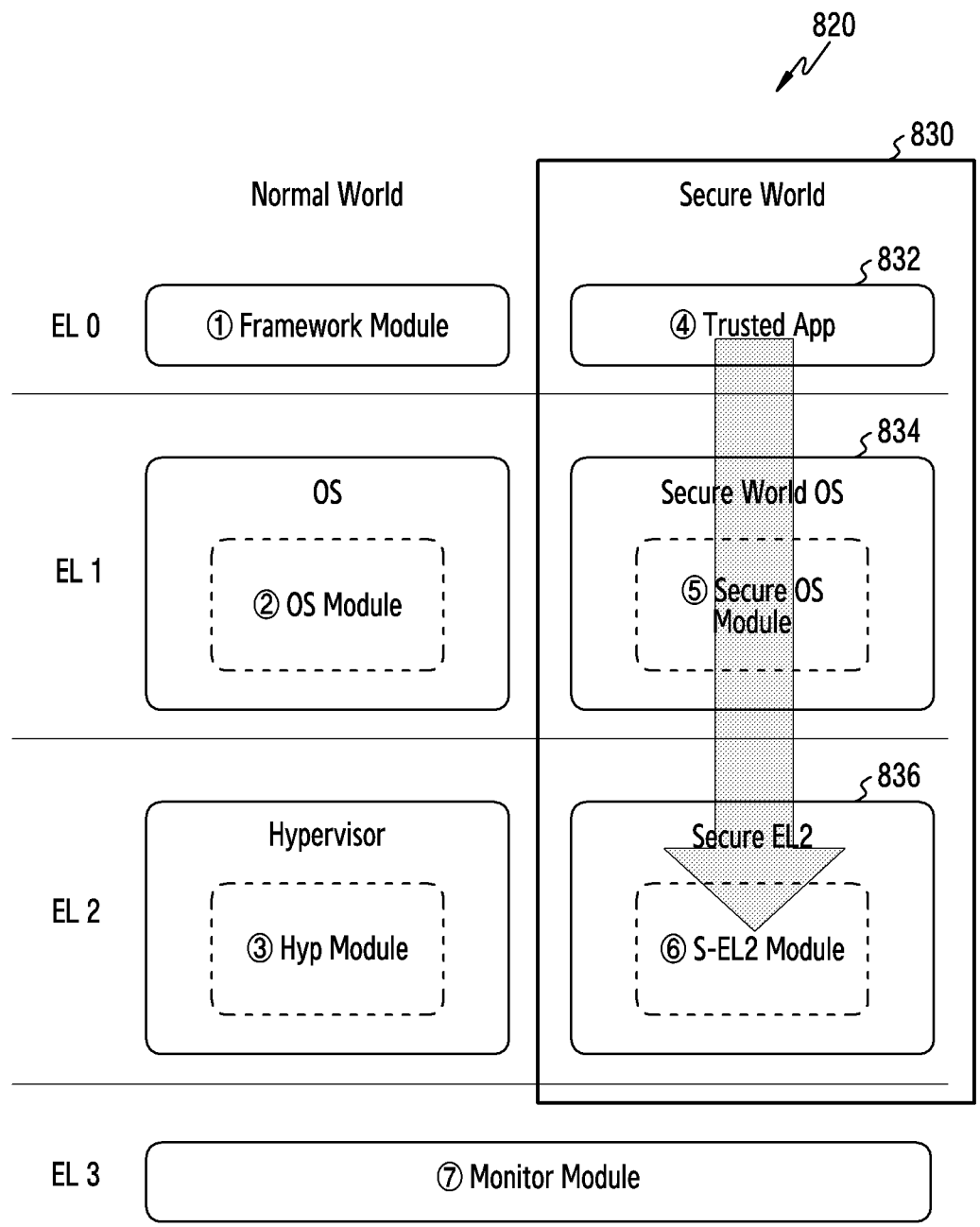
FIG. 8B is a diagram illustrating a procedure of providing an authority policy to a region allowing an operation based on a third authority according to an embodiment.
Figure 8C:
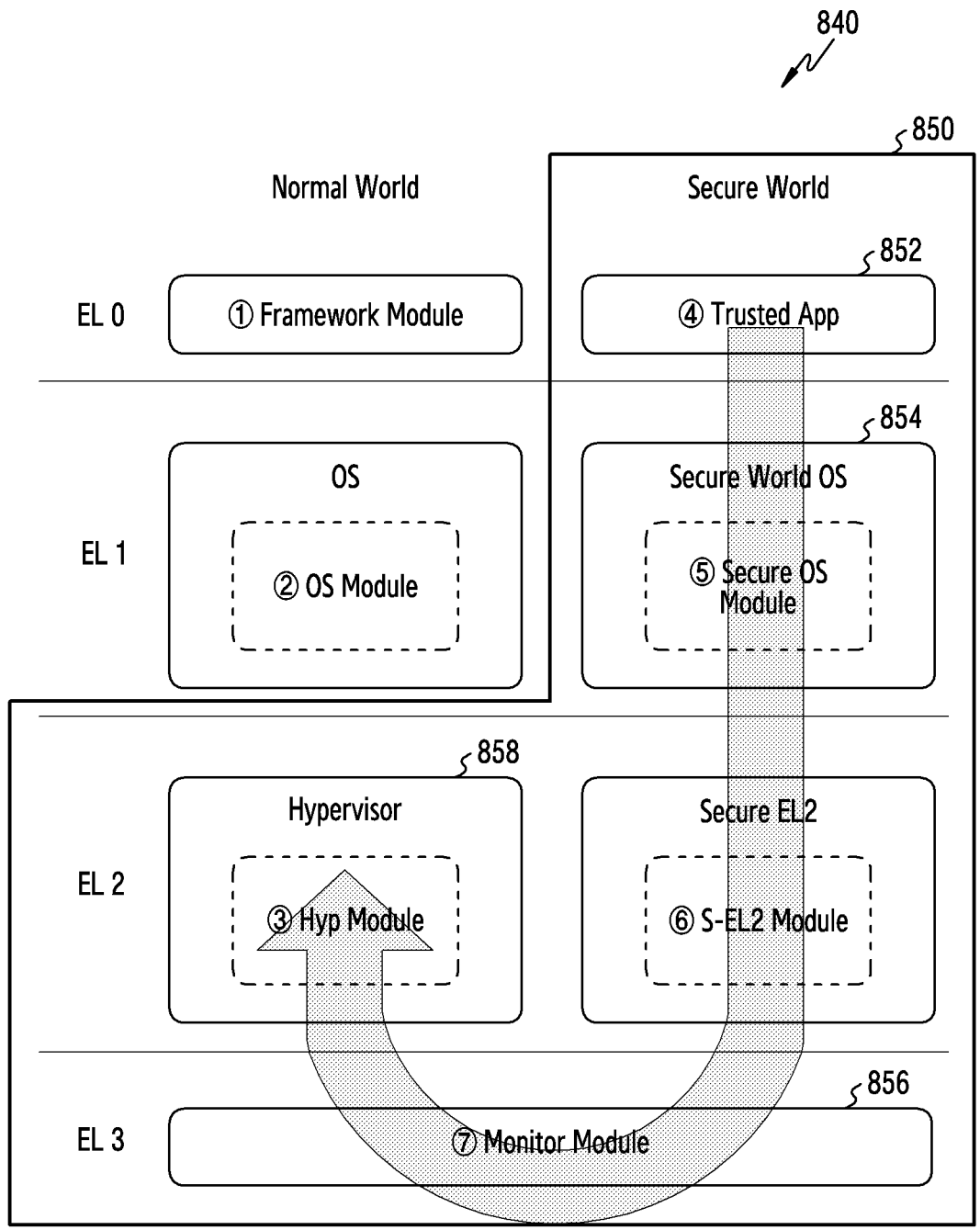
FIG. 8C is a diagram illustrating a procedure of providing an authority policy to a region allowing an operation based on a third authority according to an embodiment.

FIG. 7 is a flowchart 700 for configuring a resource authority in the electronic device 101 according to an embodiment. In addition, FIG. 8A is a diagram 800 illustrating a procedure of providing an authority policy to a region allowing an operation based on a third authority according to an embodiment, FIG. 8B is a diagram 820 illustrating a procedure of providing an authority policy to a region allowing an operation based on a third authority according to an embodiment, and FIG. 8C is a diagram 840 illustrating a procedure of providing an authority policy to a region allowing an operation based on a third authority according to an embodiment. The steps in FIG. 7 described below may correspond to various embodiments of step 530 in FIG. 5. In addition, in an embodiment below, operations may be sequentially performed, but the disclosure is not limited to the sequential operations. For example, the sequences of operations may be changed, and at least two operations may be performed in parallel.

Referring to FIG. 7, the electronic device 101 (or the processor 120) may provide a designated authority policy to a region allowing an operation based on a third authority, in step 710. For example, an authority policy may be obtained by a framework module operating in a region (e.g. EL0) allowing an operation based on a first authority, and the processor 120 may provide the obtained authority policy to a region (e.g. EL2) allowing an operation based on a third authority. For example, the authority policy may be provided through a region (e.g. EL1) allowing an operation based on a second authority to a region (e.g. EL2) allowing an operation based on a third authority.

The processor 120 may provide an authority policy through a first region 810 called a non-secure state (or normal world) to a non-secure region allowing an operation based on the third authority, as illustrated in FIG. 8A. The non-secure region may include a framework module 812, an operating system module 814, and a HYP module 816. For example, the processor 120 may provide an authority policy obtained through the framework module 812, to the HYP module 816 through the operating system module 814.

For example, the framework module 812 may operate at a low number exception level (EL0) to which the least authority has been assigned, and may obtain (or receive) an authority policy from an external electronic device (e.g. the electronic device 102, the electronic device 104, or the server 108). In addition, the framework module 812 may provide an authority policy obtained from the external electronic device, to the operating system module. As described above, the operating system module 814 may provide an authority policy received from the framework module 812, to the HYP module 816 through supporting information exchange between the framework module 812 and the HYP module 816. The authority policy may be data defining a device resource restricted from being (or allowed to be) accessed by an operating system and at least one application. The HYP module 816 may manage authority of access to a device resource, as described above. For example, the HYP module 816 (or a hypervisor) may store an authority policy received from the operating system module 814. In addition, the HYP module 816 may determine whether a device resource to be accessed by an operating system or at least one application is a restricted resource, and may provide a determination result to the operating system module 814.

According to another embodiment, the processor 120 may provide an authority policy through a second region 830 that is called a secure state (or secure world) and is separated from the first region 810, to a secure region allowing an operation based on the third authority, as illustrated in FIG. 8B. The secure region may include a trusted application 832, a secure operating system module 834, and a secure EL2 836. For example, the processor 120 may store an authority policy obtained through the trusted application 832, in the secure EL2 836 through the secure operating system module 834. For example, the trusted application 832, the secure operating system module 834, and the secure EL2 836 may be similar to the framework module 812, the operating system module 814, and the hypervisor 816 which are executed in the first region 810, differing only in that the trusted application, the secure operating system module, and the secure EL2 are executed in the second region 830 separated from the first region 810.

According to another embodiment, the processor 120 may provide an authority policy through a different second region 850 that is called a secure state (or secure world) and is separated from the first region 810, to a non-secure region allowing an operation based on the third authority, as illustrated in FIG. 8C. The secure region 850 may include a trusted application 852, a secure operating system module 854, and a monitor module 856. For example, an authority policy may be obtained by the trusted application 852, and the obtained authority policy may be stored in a non-secure region 858 allowing an operation based on the third authority in the first region, as illustrated in FIG. 8C. The authority policy obtained in the secure region 850 (e.g. obtained through the trusted application 852 and the secure operating system module 854) may be transferred through the monitor module 856 to the non-secure region 858.

The processor 120 may decode the authority policy through the region allowing an operation based on the third authority, in step 720. The processor 120 may decode an encrypted authority policy by using a hypervisor executed in the region allowing an operation based on the third authority.

The processor 120 may store the decoded authority policy in a region allowing an operation based on the third authority, in step 730. The processor 120 may store the decoded authority policy in a non-secure region allowing an operation based on the third authority or a secure region allowing an operation based on the third authority.

The processor 120 may store the decoded authority policy in a region allowing an operation based on the third authority, to finish a resource authority configuration operation. The processor 120 may determine whether an additional authority policy is obtained, after storing the decoded authority policy. For example, the processor 120 may perform an operation related to step 540 in FIG. 5.

Figure 9:
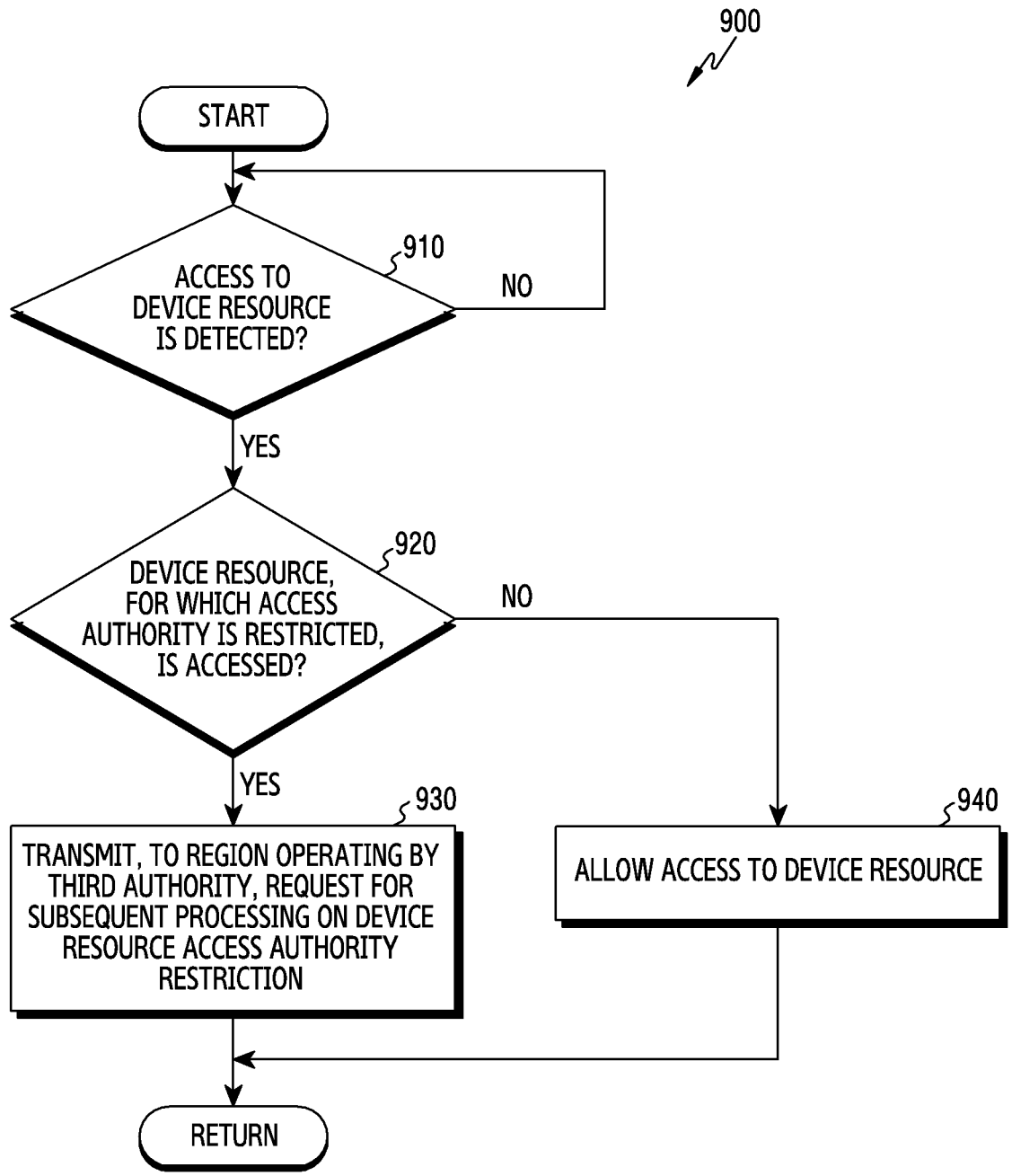
FIG. 9 is a flowchart for processing an access to a device resource in an electronic device according to an embodiment.

FIG. 9 is a flowchart 900 for processing access to a device resource in the electronic device 101 according to an embodiment. The steps in FIG. 9 described below may correspond to various embodiments of step 430 in FIG. 4A. In addition, in an embodiment below, operations may be sequentially performed, but the disclosure is not limited to the sequential operations. For example, the sequences of operations may be changed, and at least two operations may be performed in parallel.

Referring to FIG. 9, the electronic device 101 (or the processor 120) may determine whether access to a device resource is detected, in step 910. Input/output of a device resource may be managed through a database. The processor 120 may determine whether an operating system or at least one application accesses a memory address region corresponding to at least one device resource. However, the determination merely corresponds to an example, and embodiments are not limited thereto. For example, the processor 120 may detect that an operating system or at least one application accesses at least one device resource, based on various known methods.

If access to the device resource is not detected, the processor 120 may repeatedly perform an operation of determining whether access to the device resource is detected. For example, the processor 120 may perform an operation related to step 910. Step 910 may occur repeatedly in a normal situation in which the program 140 uses a device resource.

If access to the device resource is detected, the processor 120 may determine whether the device resource that has been detected to be accessed is a device resource for which access authority is restricted, in step 920. For example, the processor 120 may determine whether an event of determining authority of access to the device resource occurs, based on the determination. Step 920 may be determined in the processor 120 in view of hardware. The access authority determination event may be a designated event of allowing an authority management module to perform a subsequent processing operation when access to the device resource is restricted. The processor 120 may determine that an access authority determination event has occurred, in response to detection of access to a device resource for which access authority is restricted. For example, the processor 120 may determine that a device resource for which access authority is restricted has been accessed, in response to detection of rooting in which the highest authority is obtained in an operating system running in the electronic device 101. As another example, the processor 120 may determine that a device resource for which access authority is restricted has been accessed, in response to obtaining of an additional authority policy defining at least one device resource that is restricted or allowed, from an external electronic device (e.g. the electronic device 102, the electronic device 104, or the server 108). As another example, the processor 120 may determine that a device resource for which access authority is restricted has been accessed, in response to detection of installation of a custom binary that is not authenticated. As another example, the processor 120 may determine that a device resource for which access authority is restricted has been accessed, in response to detection of entering into a predesignated region (or area, zone) that is not permitted to be accessed.

In a case where a device resource for which access authority is restricted is accessed, if a restriction of authority of access to a corresponding device resource region is previously configured in a region allowing an operation based on a third authority, the processor 120 may determine, in view of hardware, whether the resource is a resource for which access authority is restricted, in step 920.

If a device resource detected to be accessed is a device resource for which access authority is restricted, the processor 120 may request modules in a different region to perform subsequent processing on the device resource access authority restriction in a region allowing an operation based on the third authority, in step 930. For example, a subsequent processing request may be a notification (permission fault) informing of access to a restricted device resource. As described above, the region allowing an operation based on the third authority is a region in which a hypervisor, a virtual machine, and a secure EL2 are executed, and may correspond to an exception level (EL2 330) to which more authority has been assigned compared to an exception level (EL0) of a region allowing an operation based on a first authority. In addition, an authority determination module may include a hypervisor.

If the device resource is a device resource for which access authority is not restricted, the processor 120 may allow access to the device resource in step 940. The processor 120 may perform processing such that a device resource accessed by an operating system or at least one application is executed.

Figure 10:
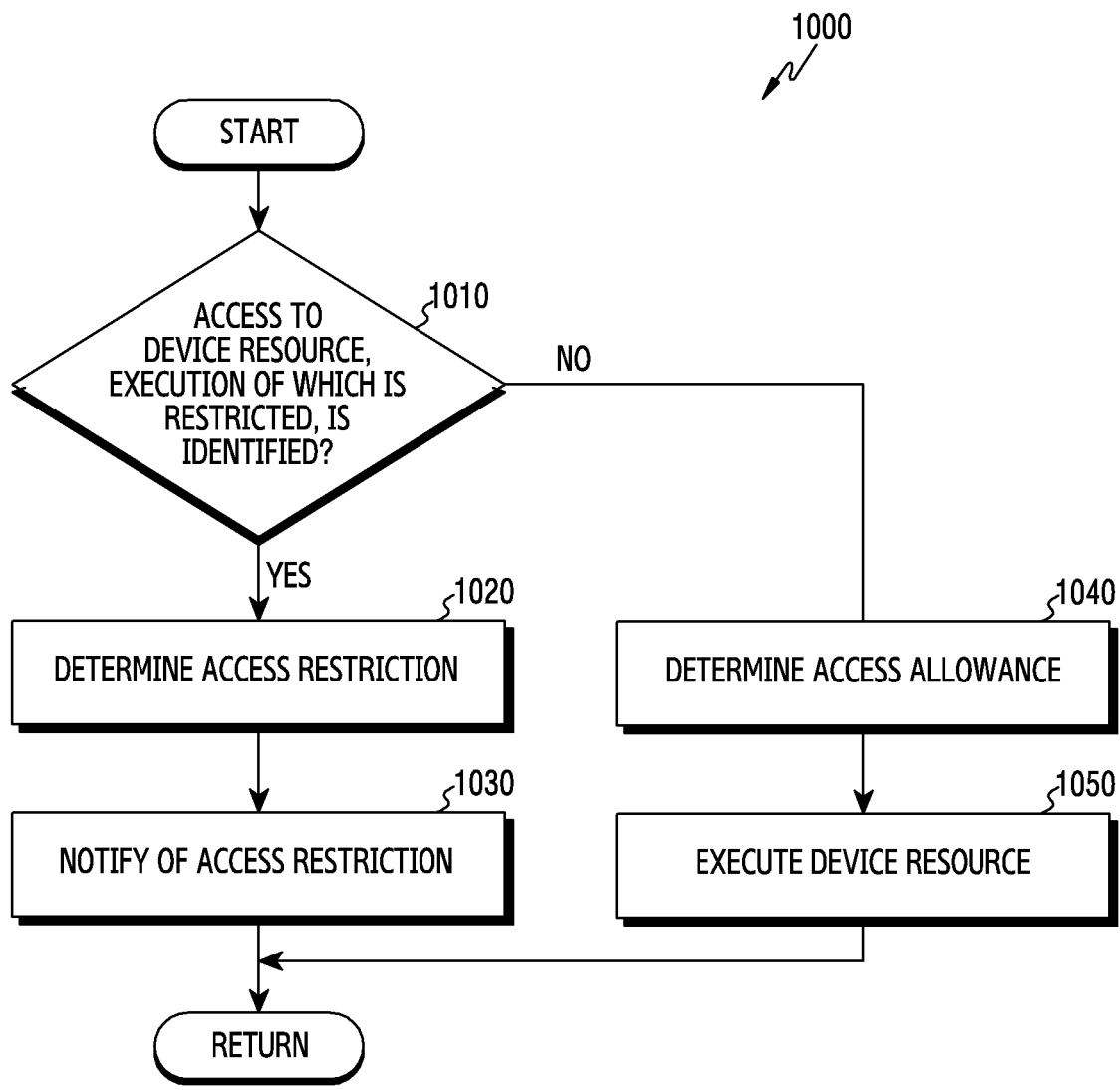
FIG. 10 is a flowchart for processing an access to a device resource in an electronic device according to an embodiment.

FIG. 10 is a flowchart 1000 for processing an access to a device resource in an electronic device according to an embodiment. The steps in FIG. 10 described below may correspond to various embodiments of step 430 in FIG. 4A or step 920 in FIG. 9. In addition, in an embodiment below, operations may be sequentially performed, but the disclosure is not limited to the sequential operations. For example, the sequences of operations may be changed, and at least two operations may be performed in parallel.

Referring to FIG. 10, the processor 120) may identify whether access to a device resource restricted from being executed is identified, in step 1010. The processor 120 may determine whether an operating system or at least one application accesses a restricted device resource, by using an authority determination module executed in a region allowing an operation based on a third authority. For example, the authority determination module may identify a restricted device resource, based on a predesignated authority policy.

If access to the restricted device resource is identified, the processor 120 may determine that a restriction on access to the device resource is required, in step 1020.

If a restriction on access to the device resource is determined to be required, the processor 120 may provide a notification informing of access restriction, in step 1030. The processor 120 may provide the notification informing of access restriction to at least one of a framework module or an operating system module. Accordingly, the processor may perform processing such that a message notifying that execution of the device resource is restricted is output through a display device 160 of the electronic device 101. As another example, the processor 120 may process execution of the application to be stopped according to the notification. However, the processing merely corresponds to an example, and embodiments are not limited thereto. For example, the notification may be provided in various forms such as an audio form, a vibration form, etc. After providing a notification informing of access restriction, the processor 120 may store a record (e.g. log) showing occurrence of an abnormal (or malicious) operation in the electronic device 101 (such as in the memory 130) or the outside (e.g. an external electronic device (e.g. the electronic device 102, the electronic device 104, or the server 108)) of the electronic device 101.

If access to the restricted device resource is not identified, the processor 120 may determine that access to a device resource is allowed, in step 1040.

If access to a device resource is determined to be allowed, the processor 120 may perform processing such that the device resource accessed by the operating system or the at least one application is executed, in step 1050.

Figure 11A:
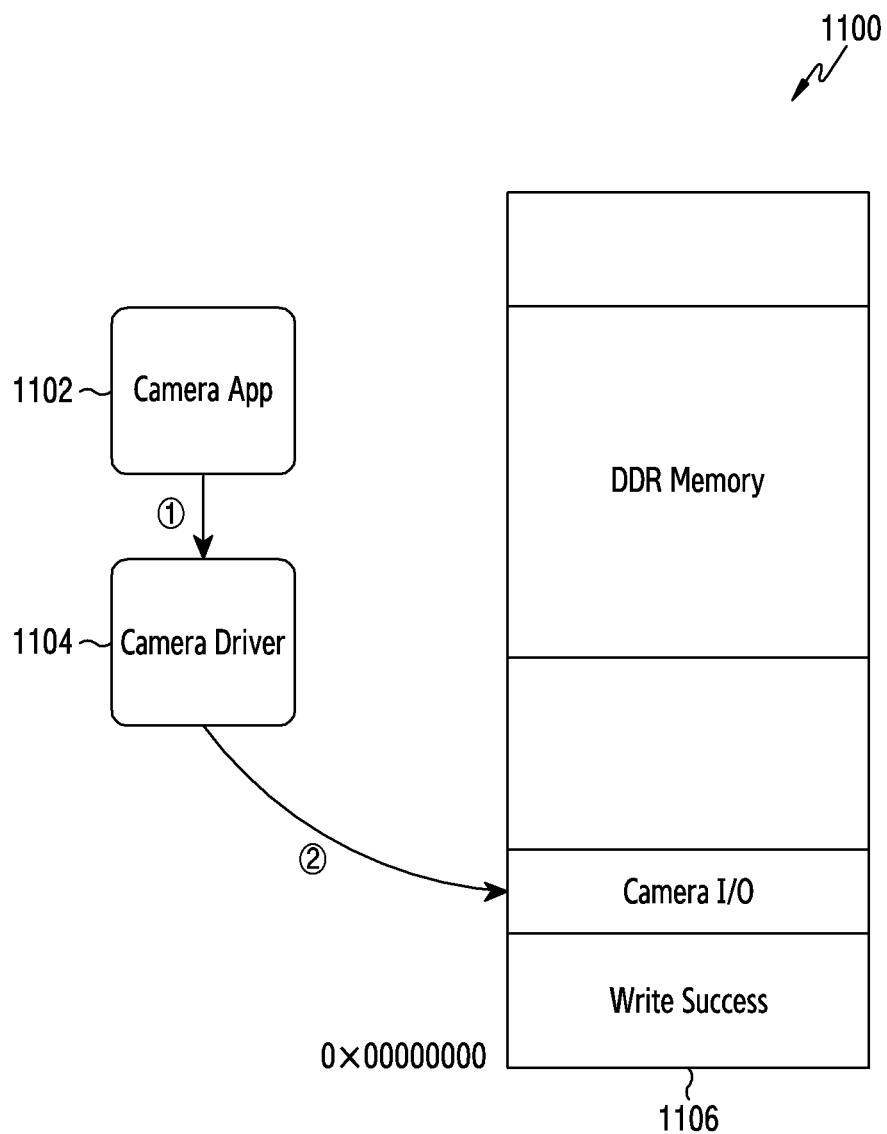
FIG. 11A is a diagram illustrating an operation of accessing a device resource in a general electronic device.

FIG. 11A is a diagram 1100 illustrating an operation of accessing a device resource in a general electronic device. In addition, FIG. 11B is a diagram 1120 illustrating an operation of accessing a device resource in the electronic device 101 according to an embodiment.

Referring to FIG. 11A, the electronic device may execute at least one application, for example, a camera application 1102, based on a designated input. In response to execution of the camera application 1102, at least one camera driver program 1104 (e.g. a camera driver of an operating system) for operating at least one device resource (e.g. a camera module) may be executed in a memory region. In addition, the camera driver 1104 may access a register 1106 related to input/output of the camera module, to process the camera module to be operated. The register 1106 of the device resource can be easily accessed by an application, and thus there may occur a problem in that the device resource of the electronic device may be used in a malicious situation. For example, there may occur a problem in that a user who finds a lost electronic device uses or attempts to use a device resource.

However, the electronic device 101 determines authority of an application to access at least one device resource, in a region in which at least one of a hypervisor (EL2), a secure EL2, or a virtual machine manager (VMM) is executed. Therefore, the electronic device can prevent forgery (or falsification) of a database related to the device resource of the electronic device, and prevent malicious or unauthorized use of the device resource of the electronic device.

Figure 11B:
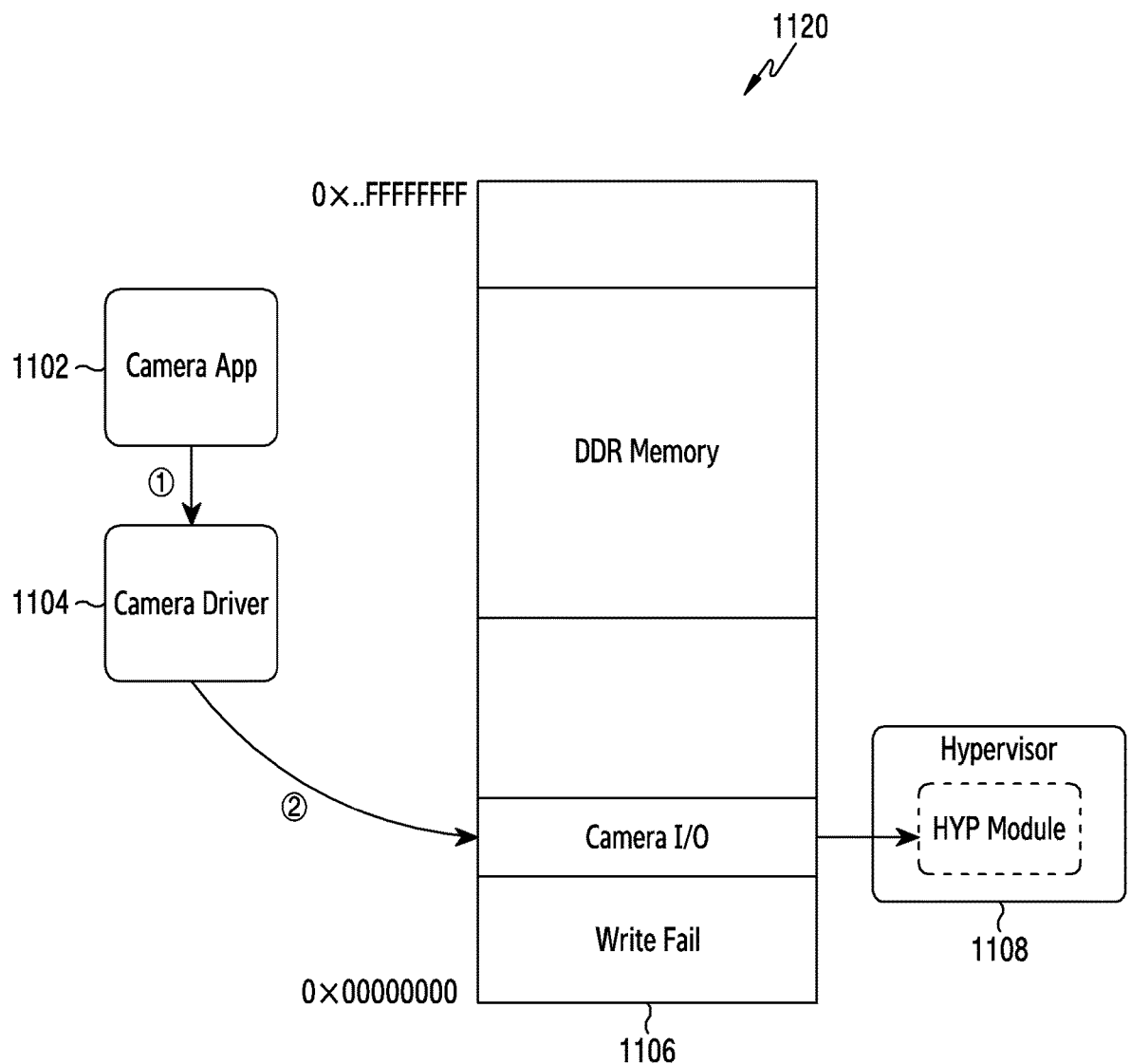
FIG. 11B is a diagram illustrating an operation of accessing a device resource in an electronic device according to an embodiment.

Specifically, referring to FIG. 11B, if the camera driver 1104 is detected to access the register 1106 related to input/output of a device resource, for example, the camera module, the processor 120 determines authority of an application to access the device resource, the authority being configured in a hypervisor 1108. Therefore, the device resource of the electronic device 101 can be prevented from being used maliciously.

According to an embodiment, an operation method of an electronic device may include executing at least one operating system executed in a first region allowing an operation based on a first authority; executing at least one application executed in a second region allowing an operation based on a second authority; and configuring authority of access to at least one device resource in response to detection of access to the at least one device resource by the at least one application by using an authority determination module executed in a third region allowing an operation based on a third authority. The authority determination module may include a hypervisor.

The third authority may include an authority higher than the first authority. The third region allowing an operation based on the third authority may include a region in which at least one of a hypervisor, a secure EL2, or a virtual machine manager (VMM) is executed.

The method of the electronic device may further include storing an authority policy defining a device resource restricted from being accessed by the at least one application, in the third region allowing an operation based on the third authority.

The method of the electronic device may further include obtaining the authority policy in the electronic device or from an external device.

The authority policy may be provided through a non-secure region of a processor to a non-secure region allowing an operation based on the third authority.

The authority policy may be provided through a secure region of a processor to a secure region allowing an operation based on the third authority.

The authority policy may be provided through a secure region of a processor to a non-secure region allowing an operation based on the third authority.

The method of the electronic device may further include determining access authority of the at least one application, based on the configured authority of access to the at least one device resource, and if the configured authority is determined to be an authority by which access to the at least one device resource is restricted, providing information indicating restriction of access to the at least one device resource.

Obtaining the authority policy may include obtaining a designated first authority policy during a boot-on operation and after the boot-on operation is complete, obtaining a second authority policy. The first policy authority policy may be stored in the electronic device, and the second authority policy may be obtained from the outside of the electronic device.

While various embodiments have been described, various changes can be made therein without departing from the scope of the various embodiments. Therefore, the scope of various embodiments should not be defined as being limited to the illustrated embodiments, but should be defined by the appended claims and equivalents thereof.

What is claimed is:

1. An electronic device comprising:
a memory; and
a processor configured to:
execute at least one operating system executed in a first region of the processor allowing an operation based on a first authority,
execute at least one application executed in a second region of the processor allowing an operation based on a second authority,
in response to detection of access to at least one device resource by the at least one application, configure authority of access to the at least one device resource by using an authority determination module executed in a third region of the processor allowing an operation based on a third authority,
store an authority policy defining a device resource restricted from being accessed by the at least one application, in the third region allowing an operation based on the third authority, and
provide the authority policy through a secure region of the processor to a non-secure region of the processor allowing an operation based on the third authority, wherein the third region allowing an operation based on the third authority comprises a region in which at least one of a hypervisor which is a non-secure region, or a secure exception level, is executed.

2. The electronic device of claim 1, wherein the third authority comprises an authority higher than the first authority.

3. The electronic device of claim 1, wherein the processor is further configured to obtain the authority policy in the electronic device or from an external device.

4. The electronic device of claim 1, wherein the processor is further configured to provide the authority policy through a non-secure region of the processor to a non-secure region of the processor allowing an operation based on the third authority.

5. The electronic device of claim 1, wherein the processor is further configured to provide the authority policy through a secure region of the processor to a secure region of the processor allowing an operation based on the third authority.

6. The electronic device of claim 1, wherein the processor is further configured to:
determine access authority of the at least one application, based on the configured authority of access to the at least one device resource; and
if the configured authority is determined to be an authority by which access to the at least one device resource is restricted, provide information indicating restriction of access to the at least one device resource.

7. The electronic device of claim 1, wherein the authority determination module comprises a hypervisor.

8. An operation method of an electronic device, the method comprising:
executing at least one operating system executed in a first region of a processor allowing an operation based on a first authority;
executing at least one application executed in a second region of the processor allowing an operation based on a second authority; and
in response to detection of access to at least one device resource by the at least one application, configuring authority of access to the at least one device resource by using an authority determination module executed in a third region of the processor allowing an operation based on a third authority,
storing an authority policy defining a device resource restricted from being accessed by the at least one application, in the third region allowing an operation based on the third authority, and
providing the authority policy through a secure region of the processor to a non-secure region of the processor allowing an operation based on the third authority, wherein the third region allowing an operation based on the third authority comprises a region in which at least one of a hypervisor which is a non-secure region, or a secure exception level, is executed.

9. The method of claim 8, wherein the third authority comprises an authority higher than the first authority.

10. The method of claim 8, further comprising:
obtaining the authority policy in the electronic device or from an external device.

11. The method of claim 10, wherein obtaining the authority policy comprises:
obtaining a designated first authority policy during a boot-on operation; and
after the boot-on operation is complete, obtaining a second authority policy.

12. The method of claim 8, further comprising:
providing the authority policy through a non-secure region of the processor to a non-secure region of the processor allowing an operation based on the third authority.

13. The method of claim 8, further comprising:
providing the authority policy through a secure region of the processor to a secure region of the processor allowing an operation based on the third authority.

14. The method of claim 8, further comprising:
determining access authority of the at least one application, based on the configured authority of access to the at least one device resource; and
if the configured authority is determined to be an authority by which access to the at least one device resource is restricted, providing information indicating restriction of access to the at least one device resource.

* * * * *